US012607207B2

(12) United States Patent
Bruck et al.

(10) Patent No.: US 12,607,207 B2
(45) Date of Patent: Apr. 21, 2026

(54) VALVE

(71) Applicant: HYDAC Fluidtechnik GmbH,
Sulzbach / Saar (DE)

(72) Inventors: Peter Bruck, Althornbach (DE);
Christian Groh, Gersheim (DE);
Frank Schulz, Blieskastel-Bierbach
(DE); Andre Jäger, Sangerhausen / OT
Oberröblingen (DE); **Lennard
Günther, Dresden (DE); Jan Frederik
Lübbert**, Dresden (DE)

(73) Assignee: HYDAC FLUIDTECHNIK GMBH

( * ) Notice: Subject to any disclaimer, the term of this
patent is extended or adjusted under 35
U.S.C. 154(b) by 0 days.

(21) Appl. No.: 18/843,585

(22) PCT Filed: Mar. 1, 2023

(86) PCT No.: PCT/EP2023/055211
§ 371 (c)(1),
(2) Date: Sep. 3, 2024

(87) PCT Pub. No.: WO2023/166073
PCT Pub. Date: Sep. 7, 2023

(65) Prior Publication Data
US 2025/0207683 A1      Jun. 26, 2025

(30) Foreign Application Priority Data

Mar. 4, 2022    (DE) ..................... 10 2022 000 767.3

(51) Int. Cl.
*F15B 13/043*       (2006.01)
*F16K 31/42*        (2006.01)
*F16K 31/40*        (2006.01)
(52) U.S. Cl.
CPC ........ *F15B 13/0433* (2013.01); *F16K 31/423*
(2013.01); *F15B 2211/413* (2013.01);
(Continued)

(58) Field of Classification Search
CPC .... F16K 31/406; F16K 31/408; F16K 31/423;
F15B 13/0433; F15B 2211/413;
(Continued)

(56) References Cited

U.S. PATENT DOCUMENTS

| | | | | |
|---|---|---|---|---|
| 4,799,645 A | * | 1/1989 | Kramer | F16K 31/406 |
| | | | | 251/38 |
| 6,073,652 A | * | 6/2000 | Wilke | F16K 31/408 |
| | | | | 91/454 |

(Continued)

FOREIGN PATENT DOCUMENTS

| | | |
|---|---|---|
| DE | 10323595 A1 | 12/2004 |
| DE | 102012006681 A1 | 10/2013 |
| EP | 2880315 B1 | 9/2017 |

OTHER PUBLICATIONS

Search Report for International Application No. PCT/EP2023/
055211, 4 pp. 2023-05-19.

(Continued)

*Primary Examiner* — Minh Q Le
(74) *Attorney, Agent, or Firm* — Slayden Grubert Beard
PLLC

(57)            ABSTRACT
The disclosure relates to a valve, comprising a main piston
for actuating a main volumetric flow and a pilot piston for
actuating a pilot volumetric flow. The main piston and the
pilot piston are guided in a valve housing in a longitudinally
movable manner, and the pilot piston can be actuated using
a magnetic device. The position of the main piston can be set
using the pilot piston in that a fluid pressure acting on the
main piston is signalled via a fluidic connection into a pilot
chamber comprising the pilot piston which keeps the main
piston in the closed position thereof, said closed position
cutting of the main volumetric flow.

15 Claims, 3 Drawing Sheets

(52) U.S. Cl.
CPC ... *F15B 2211/428* (2013.01); *F15B 2211/455* (2013.01); *F15B 2211/46* (2013.01); *F15B 2211/50509* (2013.01); *F15B 2211/513* (2013.01); *F15B 2211/526* (2013.01); *F15B 2211/5756* (2013.01); *F16K 31/406* (2013.01); *F16K 31/408* (2013.01)

(58) Field of Classification Search
CPC ......... F15B 2211/428; F15B 2211/526; F15B 2211/5756; F15B 2211/455; F15B 2211/46; F15B 2211/50509; F15B 2211/513
USPC ........................................................ 251/30.01
See application file for complete search history.

(56) References Cited

U.S. PATENT DOCUMENTS

| | | | | |
|---|---|---|---|---|
| 6,149,124 | A * | 11/2000 | Yang ..................... | F16K 31/408 251/38 |
| 6,328,275 | B1 * | 12/2001 | Yang ..................... | F16K 31/406 137/493 |
| 6,330,798 | B1 * | 12/2001 | Stephenson ........... | F15B 11/006 60/424 |
| 6,886,802 | B2 | 5/2005 | Bartolacelli et al. .... | 251/129.19 |
| 7,921,880 | B2 | 4/2011 | Jackson et al. ............... | 137/881 |
| 9,599,245 | B2 * | 3/2017 | Holmes .............. | F15B 13/0402 |
| 9,777,844 | B2 | 10/2017 | Bruck et al. | |
| 12,055,225 | B2 | 8/2024 | Shimada | |
| 12,234,842 | B2 * | 2/2025 | Cassaidy ............ | G05D 16/2097 |
| 2001/0052368 | A1 * | 12/2001 | Harms ................ | F16H 61/0251 137/625.64 |
| 2006/0273270 | A1 | 12/2006 | Bill | |
| 2009/0212244 | A1 * | 8/2009 | Pfaff ................... | F16K 31/0648 251/30.03 |
| 2010/0294380 | A1 * | 11/2010 | Nagata ................. | F16K 31/408 137/487.5 |
| 2010/0294962 | A1 | 11/2010 | Bill et al. ................... | 251/30.01 |
| 2013/0255809 | A1 | 10/2013 | Bruck | |
| 2014/0231681 | A1 * | 8/2014 | Storci ..................... | F16K 31/40 251/30.03 |
| 2015/0184773 | A1 * | 7/2015 | Hermann ............. | F16K 31/523 251/251 |
| 2015/0323083 | A1 | 11/2015 | Bruck | |
| 2017/0284277 | A1 * | 10/2017 | Wardle ............... | F16K 15/1826 |
| 2020/0011444 | A1 * | 1/2020 | Morita ................. | G05D 7/0635 |
| 2020/0182371 | A1 * | 6/2020 | Zähe .................. | F15B 13/0435 |
| 2020/0191279 | A1 * | 6/2020 | John ......................... | F16K 1/30 |
| 2021/0033212 | A1 * | 2/2021 | Kurz ...................... | F16K 1/443 |
| 2022/0154844 | A1 * | 5/2022 | Renollett ............ | F02M 21/023 |
| 2022/0325819 | A1 * | 10/2022 | Sutar ...................... | F16K 31/406 |
| 2024/0084918 | A1 * | 3/2024 | Schulze ............... | F16K 31/408 |
| 2025/0129864 | A1 * | 4/2025 | Ito ......................... | F16K 31/406 |

OTHER PUBLICATIONS

U.S. Non-Final Office Action, U.S. Appl. No. 18/843,627, 6 pages.

* cited by examiner

VALVE

CROSS-REFERENCE TO RELATED APPLICATIONS

This application claims priority to German Patent Application No. DE 10 2022 000 767.3, filed on Mar. 4, 2022 with the German Patent and Trademark Office. The contents of the aforesaid patent Applications are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to a valve, in particular a proportional valve, comprising a main piston for actuating a main volumetric flow and a pilot piston for actuating a pilot volumetric flow, the main piston and pilot piston being guided in a valve housing in a longitudinally movable manner and it being possible to actuate the pilot piston by means of a solenoid device.

DE 103 23 595 A1 discloses a valve, in particular in the form of a proportional poppet valve or gate valve, comprising a valve housing and at least three fluid ports passing through the valve housing as well as a main piston guided in the valve housing and a pilot piston which effects a pilot control and which can be actuated by means of a current-carrying solenoid device, whereby, when a pilot control is open, fluid passes from one of the two ports, which can be actuated by the main piston, via a cross-sectional restriction in the main piston and the pilot control to the third port, which can be actuated by the pilot piston, and whereby, due to the associated pressure drop, the main piston moves into a control position which can be actuated by the fluid quantity for each of the two fluid ports.

EP 2 880 315 B1 discloses a valve, in particular a pilot-operated proportional directional-control seat valve, comprising a valve housing which has a fluid inlet and a fluid outlet, it being possible to control the fluid flow between this inlet and outlet by means of a main piston, a pilot valve chamber being provided on a rear side of the main piston with a pilot valve closing member, which can be moved by an actuating device and with which the fluid flow between the pilot valve chamber and the fluid outlet can be controlled, an inlet orifice being arranged between the fluid inlet and the pilot valve chamber, it being possible to reduce the opening cross-section of the inlet orifice by means of a control element, the inlet orifice having a plurality of orifice holes, it being possible to reduce the opening cross-section of at least one of the orifice holes by means of the control element, and splitting of the inlet orifice into a plurality of orifice holes making it possible to switch the inlet orifice in a plurality of opening stages.

Such pilot-operated directional-control valves with electro-hydraulic actuation control the start, stop and direction of a volumetric flow as well as the speed, acceleration and deceleration of a hydraulic consumer connected to the valve, for example in the form of a hydraulic working cylinder. Pilot-operated directional-control valves are generally used where large volumetric flows are controlled with low flow losses. However, low flow losses at high volumetric flows mean large opening cross-sections and therefore large strokes of the main piston. Disturbances which impair the valve function are the flow and friction forces which counteract the switching movement and are dependent on the volumetric flow and differential pressure, i.e. the valve performance. Particularly in the case of mechanical actuation by a spring, usually in the form of a return spring, the rated value of the spring force may be too small compared to the frictional force for resetting the piston slide valve. To meet these demands on the solenoid system in terms of stroke and force, either the solenoid system would have to be dimensioned correspondingly large or the valve would have to be pilot-operated hydraulically. As shown above, valves are known in prior art for such applications, which therefore inevitably have a hydraulic pilot control.

SUMMARY

A need exists to provide an improved valve in terms of its functional behaviour. The need is addressed by the subject matter of the independent claim(s). Embodiments of the invention are described in the dependent claims, the following description, and the drawings.

DESCRIPTION

Figure 1:
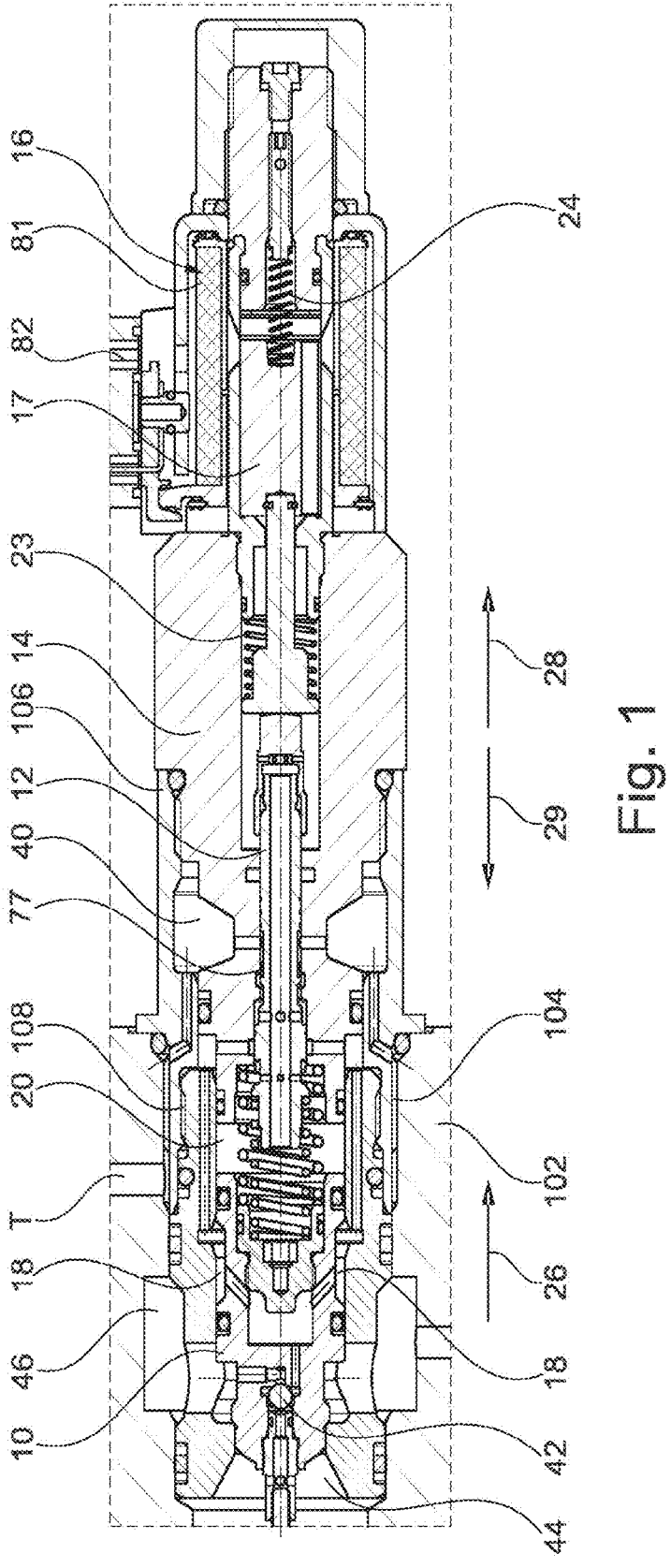
FIG. 1 shows example key components of an example valve as a whole.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the position of the main piston can be adjusted by means of a pilot piston, in that a fluid pressure acting on the main piston is signalled via a fluid connection into a pilot chamber with the pilot piston which, when an actuated solenoid device is in an actuating position, holds the main piston in its closed position preventing the main volumetric flow, and in that, when the solenoid device is not actuated or not energised, the pilot piston is in a starting position in which the fluid pressure, decoupled from the pressure supply via the main piston, in the pilot chamber decreases towards the tank side until the main piston reaches an open position which controls the main volumetric flow, an improved quality of control is created overall, with low pressure losses while preventing leakages during operation of the valve.

In some embodiments of the valve, it is provided that the solenoid device has a pull-type actuating solenoid which, when energised, moves the pilot piston, for example against the action of an energy accumulator ($F_{solenoid\ spring}$), from its starting position to its actuating position in which the main piston is held in its closed position. When de-energised, the pilot piston is thus in a front starting position which is directed towards the main piston, due to which the pilot chamber is separated from a pressure supply and opened towards the tank. If a pressure now builds up at the main piston on the inlet side, this fluid pressure pushes the main piston into the open position and releases a fluid-conducting connection for guiding a main flow between two fluid port points in the valve housing which for example engage in the valve housing, axially on the one hand and radially on the other. To achieve the "normally open variant" presented in such a way, a pull-type actuating solenoid is used instead of a push-type solenoid. This gives rise to the concept of stroke control proportional to the magnetic force (current) due to a pull-type actuating solenoid, which produces the normally open valve variant, which results in a falling linear valve characteristic curve for the desired linear adjustment of the position of the main piston via the magnetic force, with balancing of the flow force and sealing friction on the main piston.

In some embodiments of the valve, it is provided that the pilot piston can be brought into its actuating position under the action of the force ($F_{spring}$) of an energy accumulator in conjunction with a force ($F_{actuator}$)) of the solenoid device acting in the same direction, the pilot piston being substantially pressure-balanced, taking into account a frictional force ($F_{friction}$), where:

$$F_{actuator} - F_{spring} - F_{friction} = 0$$

A spring, which is designed as a solenoid spring and has a force ($F_{solenoid\ spring}$) similar to the magnetic force ($F_{magnet}$)), acts on the pull-type actuating solenoid in operative connection and the overall force resulting from this is referred to as ($F_{actuator}$) by the formula:

$$F_{actuator} - F_{solenoid\ spring} - F_{magnet}.$$

Since to this effect the pilot piston is in a balance of forces when the main piston opens to control the main volumetric flow between the two possible fluid port points in the valve housing, the stroke of the main piston can be adjusted in this respect via the pilot control.

Some embodiments of the valve are described in the dependent claims. In particular, it is beneficial if the main piston is coupled to a displacement measuring device for detecting its position. Due to the actuation of the main piston via the pilot piston, the valve manages with a solenoid device that is correspondingly small in dimension with reduced opening cross-sections in the region of the volumetric flows to be controlled, for which only small strokes of the main piston are necessary. This results in a highly dynamic proportional throttle valve.

The valve is discussed in greater detail below with reference to the drawings and further embodiments. Specific references to components, process steps, and other elements are not intended to be limiting. The drawings are not to scale.

The valve shown in the FIGS. is a so-called proportional valve and has a main piston 10 for controlling a main volumetric flow. Furthermore, a pilot spool 12 is present for controlling a pilot volumetric flow, the main piston 10 and the pilot piston 12 being guided together so as to be longitudinally movable in a valve housing 14. As can be seen in particular from FIG. 1, the pilot piston 12 is actuated by means of a solenoid device 16 so as to be movable in the valve housing 14.

Figure 2:
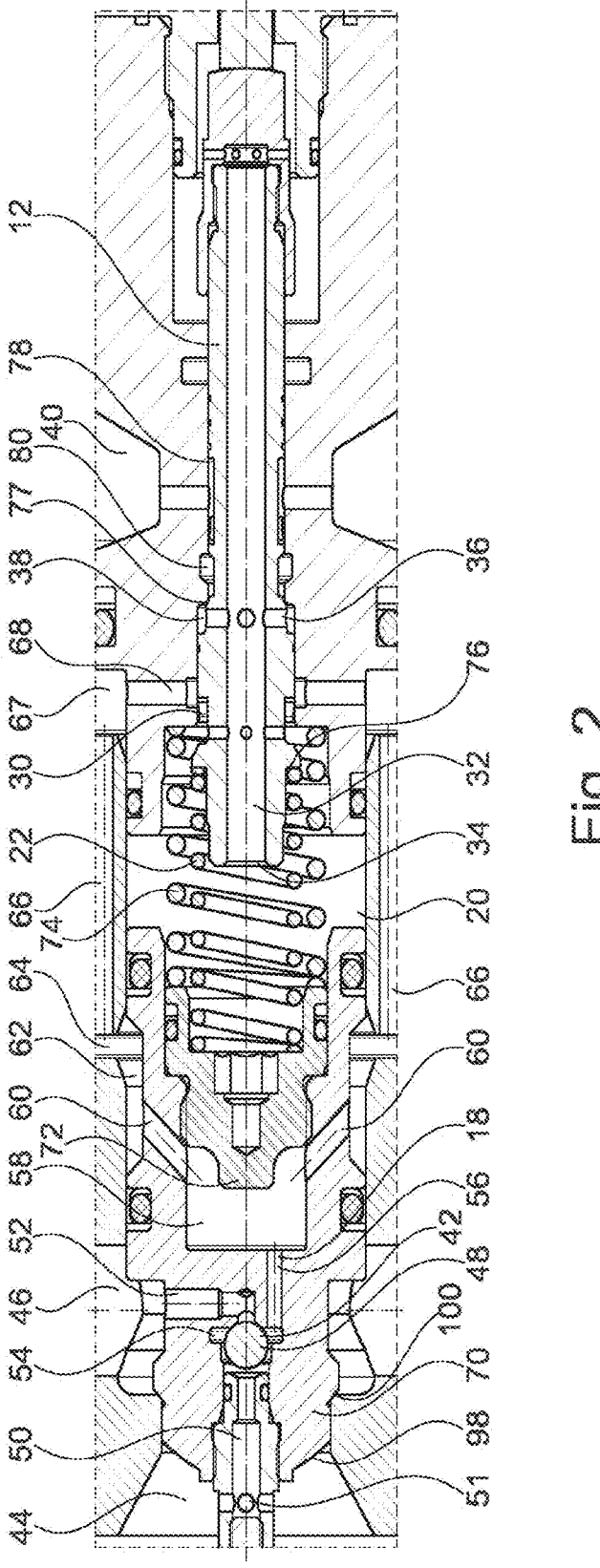
FIG. 2 shows a front part of the valve according to FIG. 1 in a closed valve position.
Figure 3:
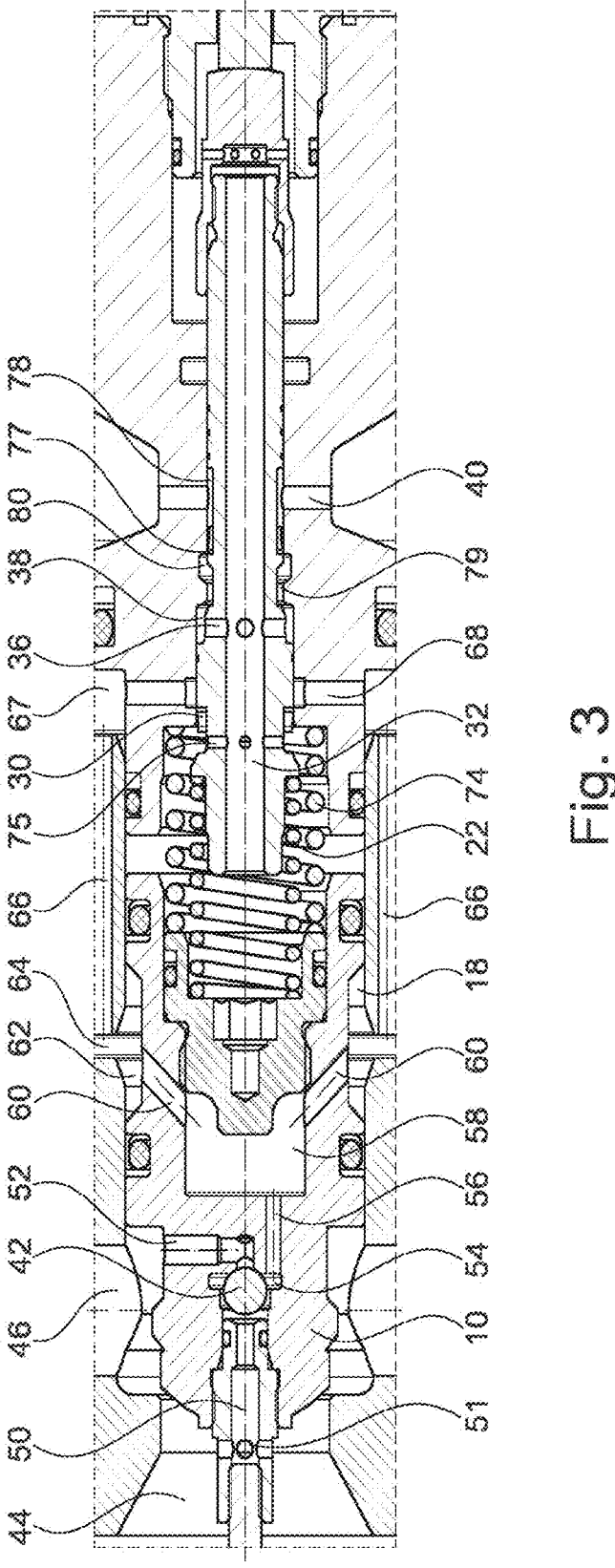
FIG. 3 shows an example diagram corresponding to FIG. 2 with the valve open.

The position of the main piston 10 can be adjusted by means of the pilot piston 12, by signalling a fluid pressure acting on the main piston 10 via a fluid connection 18 into a pilot chamber 20 with the pilot piston 12, which holds the main piston 10 in its closed position preventing the main volumetric flow when the energised solenoid device 16 is actuated, as shown in FIG. 2, whereby, when the de-energised solenoid device 16 is not actuated, the pilot piston 12, starting from the energised actuating position shown in FIG. 2, moves to the left as viewed in the direction of the FIGS. into a starting position according to FIG. 3, in which the fluid pressure, substantially decoupled from the pressure supply via the main piston 10, drops in the pilot chamber 20 until the main piston 10 reaches an opening position regulating the main volumetric flow, as shown in FIG. 3 by way of example for one of the possible opening positions. If the directions "right" and "left" are mentioned, this means a direction viewed in the direction of the FIGS.

The position of the main piston 10 is accordingly adjusted with the aid of the pilot piston 12. In this respect, the balance of forces at the pilot piston 12 must be taken into account, which piston is virtually pressure-balanced except for any manufacturing tolerances, which is why there is no compressive force. This results in the following formula relationships:

$$F_{actuator} - F_{spring} - F_{friction} =$$

$$F_{actuator} - (F1_{spring} + x * c) - F_{friction} = 0, \text{ where}$$

$$x = \frac{F_{actuator} - F_{spring} - F_{friction}}{c} =$$

$$\frac{-F_{magnet} + F_{solenoid\ spring} - F1_{spring} - F_{friction}}{c},$$

where $$F_{actuator} = F_{solenoid\ spring} - F_{magnet}, \text{ thereby}$$

$F_{friction}$=induced frictional force due to the movement of the pilot piston 12, c=average spring stiffness of the springs used, $F1_{spring}$=the force of the compression spring 22 acting on the end of the pilot piston 12, and $F_{solenoid\ spring}$ the compression spring 23 acting on an actuating solenoid 17, which acts towards the actuating position of the pilot piston 12.

An additional compression spring 24 can act on the actuating solenoid 17 in the opposite direction of action to its pulling actuating direction, which serves to overcome the so-called dead current, i.e. to provide said current until the actuating solenoid 17 has overcome the spring forces as a whole and starts to move. In this way, any barriers in the operation of the valve can be prevented.

In the following, the individual forces which occur, in particular spring forces, are shown with their operating direction in FIG. 1 using force arrows. In this case, the spring force $F_{spring}$ acting on the end face of the pilot piston 12 is denoted by the arrow 26, the magnetic force for the actuating solenoid 17 by the arrow 28 and the spring force $F_{solenoid\ spring}$ acting on the actuating solenoid by the arrow 29.

As can also be seen from the FIGS., the pilot piston 12 is configured as a hollow piston which has a first recess 30 on its outer circumference in the manner of an annular shoulder which, when the respective solenoid device 16 is actuated or energised, as shown in the diagram of FIG. 2, establishes a fluid-conducting connection to the main piston 10 in an operating position and, when the solenoid device 16 is not actuated or is kept de-energised, as shown in FIG. 3, moves into the starting position under the action of the two compression springs 23, 24 and interrupts the aforementioned fluid-conducting connection. The pilot piston 12 configured as a hollow piston has a fluid-conducting channel 32 along its inner circumference, which with its one free end 34 opens out into the pilot chamber 20 and via a radially extending channel section 36 of this axially extending channel 32 opens into a second annular recess 38 on the outer circumference of the hollow or pilot piston 12, which, when solenoid device 16 is not actuated, as shown in the diagram of FIG. 3, reaches a fluid-conducting connection to a tank port 40 when the first recess 30 is disconnected from the fluid-conducting connection to the main piston 10. All said fluid guides, such as the channel section 36 and the tank port 40, can be present multiple times as shown, only one fluid guide being routinely provided with a reference numeral for the sake of a simpler, clearer diagram.

Connected in the fluid-conducting connection between the main piston 10 and the pilot chamber 20 is a leak-proof changeover valve 42 which forwards the higher pressure in each case from the two fluid ports 44, 46 in the valve housing 14, via which the main volumetric flow to be controlled is routed, into the pilot chamber 20 as a signal pressure when the valve is "energised" closed. If the fluid pressure at the end face, axial fluid port 44 is greater than at the radial fluid port 46 introduced at right angles to it, fluid with this higher pressure reaches the changeover valve 42 with its closing ball 48 via the fluid port 44 and a longitudinal channel 50 with a transverse drilled hole 51 in the front region of the main piston 10, which is configured to be leak-proof. In this respect, the aforementioned closing ball 48 is moved to the right as viewed in the direction of the FIGS. and at the same time closes a radial channel 52 introduced in the main piston 10, which channel opens into the fluid port 46 in the valve housing 14. A further longitudinal channel 56, which is in turn introduced in the main piston 10 and which with its free face end opens into a fluid chamber 58 in the main piston 10, adjoins the valve chamber 54 of the changeover valve 42. The fluid chamber 58 is connected via at least two connecting channels 60 in the main piston 10, which are arranged at an oblique angle of 45° to the longitudinal axis of the valve, to a further fluid chamber 62 which, configured as an annular chamber, is arranged between the valve housing 14 and the main piston 10. Subsequently, the further fluid chamber 62 merges in a fluid-conducting manner into an annular chamber 64 which is widened in cross-section and arranged in the valve housing 14 and from there a longitudinal channel section 66 leads oppositely in each case into a further annular space 67 and then merges into a radially arranged transverse channel part 68 in the valve housing 14, which at its inner free end towards the pilot piston 12 is widened in cross-section in a groove shape and which, according to the diagram in FIG. 2, comes into partial fluid overlap with the annular first recess 30 on the outer circumference of the pilot piston 12, the fluid-conducting connection in this respect being established as soon as the pilot piston 12, starting from its de-energised starting position according to FIG. 3 and moving from left to right when the solenoid device 16 is energised, reaches its right-hand actuating position according to FIG. 2. In this respect, the valve is then in its closed position blocking the fluid path between the ports 44, 46.

It is understood that, as already explained, the respective channels and other connections, as shown, can be accommodated on the valve multiple times as required to ensure safe fluid guidance. In any case, the components 50, 52, 54, 56, 58, 60, 62, 64, 66, 67, 68 and 30 form the possible fluid connection 18 between the fluid ports 44, 46 on the main piston 10 and the pilot chamber 20 between the main piston 10 and the pilot piston 12, provided that the solenoid device 16 is energised. In this respect, the respectively higher pressure at the fluid port 44 or 46 in the closed valve position of the main piston 10 is forwarded or signalled further to the pilot chamber 20, provided that the pilot piston 12 assumes its right-hand energised actuating position shown in FIG. 2. Otherwise, in the unactuated, normally open position of the solenoid device 16, the aforementioned fluid-conducting connection 18 between the first recess 30 and the transverse channel part 68 is prevented by the pilot piston 12 assuming its left-hand starting position shown in FIG. 3. In this respect, the pressure in the pilot chamber 20 is switched via the tank port 40 to the largely unpressurised tank side T (see FIG. 1) so that the main piston 10 can assume one of its opening positions according to FIG. 3 in which a main fluid connection is established between the fluid ports 44 and 46 in both possible fluid directions.

If the pressure at the radial port 46, as the further fluid port in the valve housing 14, is greater than at the fluid port 44, the changeover valve 42 is switched, as viewed in the direction of the FIGS., by the closing ball 48 now assuming its left-hand closing position which closes the channel 50. In this way, fluid with predefinable pressure reaches the further longitudinal channel 56 via the fluid port 46 and the radial channel 52 as well as the valve chamber 54, so that in this respect the remaining fluid connection 18 to the pilot chamber 20 is now released via the route thereto when the pilot piston 12 assumes its energised, right-hand actuating position shown in FIG. 2. Typically, a fluid pressure originating from a pressure supply device, such as a hydraulic pump, should be present at the fluid port 44 and a hydraulic consumer, such as a hydraulic cylinder, should be connected to the fluid port 46. Other assignments of the fluid ports 44, 46 are conceivable in the context of using such proportional valves. Due to its leak-proof nature, the valve is particularly suitable as a so-called load valve with which loads can also be lowered in a controlled manner, particularly if the actuating solenoid device 16 cooperates with an electronic open-loop or closed-loop control system.

As further emerges from the FIGS., the main piston 10 is composed of two components 70, 72, the aforementioned components 70, 72 with their free end faces directed towards each other defining the fluid chamber 58, viewed in the axial displacement direction of the valve pistons 10, 12. A second compression spring 74 engages as a further energy accumulator on the free end face of the second component 72, which is directed towards the solenoid device 16, said compression spring being supported with its other free end on stationary parts of the valve housing 14 and, designed as a compression spring, exerting a pre-load on the main piston 10 in the closing direction thereof. The compression spring 22 extends on the inner circumference of the second compression spring 74 and coaxial therewith, one free end of said compression spring being supported on a shoulder in the interior of the second component 72 and its other free end being supported on an annular protrusion 76 on the pilot piston 12. In this way, the main piston 10 is pre-loaded via the compression springs 74 with their respective spring force and the pilot piston 12 is pre-load via the spring 22.

The following now describes how the movement of the main piston 10 is controlled. The movement of the main piston 10, viewed in the direction of FIG. 2, into a state as shown in FIG. 3, i.e. to the left, takes place as follows. The pressure present at the respective fluid port 44 or 46 upstream of the main piston 10, which is signalled to the pilot piston 12 via the changeover valve 42 and the fluid connection 18, initially holds the main piston 10 closed due to the pressure in the pilot chamber 20, as shown in the diagram of FIG. 2, via the surface difference formed by the opposing end faces of the main piston 10 when the solenoid device 16 is energised. In this case, according to the diagram in FIG. 2, the pilot piston 12 is in leak-proof contact with the valve housing 14 via an annular valve seat 77, so that when the valve is closed there can be no unintentional leakage flow from the pilot chamber 20 towards the tank port 40.

If there is no force generated by the solenoid device 16 (normally open), the pilot piston 12, viewed in the direction of the FIGS., is moved to its left-hand starting position as shown in FIG. 3, taking into account at least the compression spring 23 which acts between the pilot piston 12 and the actuating solenoid 17 of the solenoid device 16. In the aforementioned left-hand starting position, the recess 30 on the outer circumference of the pilot piston 12 is closed by associated housing parts of the valve housing 14. Similarly, the respective transverse channel 68, which is connected to the fluid chamber 58 in a fluid-conducting manner and thus to the respective pressure introduction side on the main piston 10, is closed, for example in a fluid-tight manner, by the adjacent outer circumference of the pilot piston 12. Furthermore, the main piston 10 is held towards its closed position by the outer second compression spring 74.

However, the pilot chamber 20, which is correspondingly cut off from the pressure supply from the main piston 10, can now be kept depressurised towards the tank port 40 via the fluid-conducting channel 32 inside the pilot piston 12, in that the fluid pressure in the pilot chamber 20 inevitably decreases in this respect. In this way, a fluid connection is established from the pilot chamber 20 via the fluid-conducting channel 32 to the transverse channel section 36 of the aforementioned channel 32 extending in the opposite direction. In addition to the end-face inlet on the pilot piston 12, there is a further, permanent fluid connection to the pilot chamber 20 via a transverse channel guide 75 which opens into the channel 32 of the pilot piston 12 with its respective one free end. As the pilot piston 20 is in its normally open starting position, the second recess 38 in the valve housing 14 is opened to the left by means of the compression spring 23 and fluid can overflow from there via an annular shoulder recess 79 in the valve housing 14 into a relief space 80, which is formed by an axially widened annular recess in the valve housing 14. From this relief space 80, when the valve seat 77 is released, the fluid under pressure from the pilot chamber 20 then flows out into an annular channel 78, which is recessed in the pilot piston 12 with a predefinable length in such a manner that the annular channel 78 is in fluid-conducting alignment with the tank port 40 in every possible displacement position of the pilot piston 12. The fluid in the annular channel 78 is then transferred in this respect to the tank side T of the valve device via the respective tank port 40, so that in this respect the pilot chamber 20 is completely depressurised. Depending on the fluid pressure present in each case at the main piston 10, this is then opened against the spring action of the compression springs 22 and 74 and a new equilibrium is established at the open valve.

If, on the other hand, the actuating solenoid 17 of the solenoid device 16 is energised, the associated actuating solenoid 17 or solenoid armature moves to its right-hand displacement or stop position against the action of the additional compression spring 24 and the solenoid spring 23, viewed in the direction of FIG. 1. For this purpose, the solenoid device 16 has an energisable coil 81 which, appropriately energised, moves the actuating solenoid 17 or the solenoid armature from its starting position shown in FIG. 1 to the right into its actuating position. If the coil 81 is not energised via a conventional plug connection 82 on the solenoid device 16, the two compression springs 23, 24 permit an unobstructed return to the starting position shown in FIG. 1, which corresponds to the position of the pilot piston 12 as shown in FIG. 3, i.e. "normally open".

In this starting position of the solenoid device 16, the pilot piston 12 is therefore also in its left-hand starting position, as shown in the diagram of FIG. 3, and as already explained, the pilot chamber 20 is accordingly no longer supplied with fluid of a predefinable pressure from the main piston 10. The fluid pressure prevailing in the pilot chamber 20 also acts basically on the rear of the main piston 10, so that the main piston 10 is securely held due to the surface ratio, provided that the pilot piston 12 assumes the position shown in FIG. 2. Accordingly, the actuating position or energised position corresponds to the securely closed position for the main piston 10. Furthermore, fluid reaches the rear thereof via the fluid-conducting channel 32 of the pilot piston 12, in order to establish pressure equalisation for the movable components in this way; according to the diagram shown in FIG. 2 alone, a leak-proof shutoff of the fluid path from the pilot chamber 20 towards the tank port 40 is now achieved via the valve seat 77, the shutoff of the fluid path being leak-tight in this direction.

Furthermore, the main piston 10 has, on its free, left-hand end face, a convex end face 98 formed of a predefinable radius which serves to establish a linear relationship between the stroke of the main piston 10 and the opening surface it produces at the fluid ports 44 or 46. Otherwise, the main piston 10 is movably guided via stepped annular surfaces so as to be longitudinally movable on the inner circumference of the valve housing 14, a corresponding inclined surface forming a further valve seat 100 so that in this respect the main piston 10 in its closed position according to FIGS. 1 and 2, undertakes a leak-proof shutoff between the fluid ports 44, 46. Individual sealing ring systems, not described in greater detail, regularly in the form of conventional O-sealing rings, ensure fluid-tight delimitation of the individual fluid spaces and fluid routes among one another, as indicated above.

As shown in particular in FIG. 1, the valve body as a whole according to FIGS. 2 and 3 can be inserted in the usual manner in a valve block 102 which has the fluid-conducting ports 44, 46. There is a permanent fluid connection between the tank port 40 and the tank side T of the overall valve device via a fluid connection 104 partially guided in the valve block 102. As can further be seen from FIG. 1, the connecting channels 60 are encapsulated towards the outside by circumferential parts of the valve housing 14. As can also be seen from FIG. 1, a flange part 106 is placed on the valve block 102 from the outside and is firmly joined to it in the usual manner. Furthermore, parts of the valve housing 14 are firmly screwed to the flange part 106 on inner circumference thereof via a threaded section 108.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, device, or other unit may be arranged to fulfil the functions of several items recited in the claims. Likewise, multiple processors, devices, or other units may be arranged to fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A valve, comprising:
a main piston for actuating a main volumetric flow; and
a pilot piston for actuating a pilot volumetric flow;
wherein
the main piston and pilot piston are guided so as to be longitudinally movable in a valve housing; wherein
the pilot piston can be actuated using a solenoid device; wherein
the position of the main piston can be adjusted using a pilot piston in that a fluid pressure acting on the main piston is signalled into a pilot chamber with the pilot piston via a fluid connection, which pilot piston, when an actuated solenoid device is in an actuating position, holds the main piston in its closed position preventing the main volumetric flow; wherein,
when the solenoid device is not actuated, the pilot piston is in a starting position in which the fluid pressure, decoupled from the pressure supply via the main piston, in the pilot chamber decreases towards the tank side until the main piston reaches an open position which controls the main volumetric flow; and wherein the solenoid device has a pull-type actuating solenoid which, when energized, moves the pilot piston from its starting position to its actuating position in which the main piston is held in its closed position.

2. The valve of claim 1, wherein the pilot piston can be brought into its actuating position under the action of a force (F_spring) of an energy accumulator in conjunction with a force (F_(solenoid spring)−F_magnet) of the solenoid device acting in the same direction, whereby the pilot piston is substantially pressure-balanced, taking into account a frictional force (F_friction), where F_(actuator)−F_(spring)−F_friction=0.

3. The valve of claim 1, wherein the pilot piston is configured as a hollow piston which has a first recess on its outer circumference which, when the solenoid device is actuated, establishes a fluid-conducting connection to the main piston and, with its inner circumference, forms a fluid-conducting channel, which with its one free end opens out into the pilot chamber and which via a channel section of this channel opens into a second recess on the outer circumference of the hollow piston, which, when the solenoid device is not actuated comes into fluid communication with a tank port in the valve housing and in this way, the first recess is disconnected from the fluid-conducting connection to the main piston.

4. The valve of claim 1, wherein a changeover valve is connected in the fluid-conducting connection between the main piston and the pilot chamber, which valve forwards the respectively higher pressure of two fluid ports in the valve housing, via which the main volumetric flow is guided, into the pilot chamber as the signal pressure.

5. The valve of claim 1, wherein, as part of a fluid connection, a fluid chamber is created in the main piston, which chamber opens out via at least one connecting channel in the main piston into a further fluid chamber between the valve housing and the main piston, which chamber opens out via at least one further connecting channel in the valve housing with at least a partial overlap into the first recess in the pilot piston.

6. The valve of claim 1, wherein at least one further connecting channel is arranged in the pilot piston and in the valve housing, using which the second recess on the pilot piston can be connected to a tank port.

7. The valve of claim 1, wherein the main piston is held towards its closed position using a further energy accumulator.

8. The valve of claim 1, wherein the respective energy accumulator is formed of a compression spring, wherein the compression spring for the main piston has a higher spring stiffness than the compression spring for the pilot piston, and wherein the compression spring for the main piston encompasses the compression spring for the pilot piston.

9. The valve of claim 1, wherein the main piston, which is formed at least partially convex on its free end face, has a radius for establishing a linear relationship between the stroke of the main piston and the opening surface it can achieve at one of the fluid ports in the valve housing.

10. The valve of claim 1, wherein the valve is a proportional valve.

11. The valve of claim 1, wherein the solenoid device has a pull-type actuating solenoid which, when energised, moves the pilot piston against the action of an energy accumulator (F_(solenoid spring)) from its starting position to its actuating position in which the main piston is held in its closed position.

12. The valve of claim 2, wherein the pilot piston is configured as a hollow piston which has a first recess on its outer circumference which, when the solenoid device is actuated, establishes a fluid-conducting connection to the main piston and, with its inner circumference, forms a fluid-conducting channel, which with its one free end opens out into the pilot chamber and which via a channel section of this channel opens into a second recess on the outer circumference of the hollow piston, which, when the solenoid device is not actuated comes into fluid communication with a tank port in the valve housing and in this way, the first recess is disconnected from the fluid-conducting connection to the main piston.

13. The valve of claim 2, wherein a changeover valve is connected in the fluid-conducting connection between the main piston and the pilot chamber, which valve forwards the respectively higher pressure of two fluid ports in the valve housing, via which the main volumetric flow is guided, into the pilot chamber as the signal pressure.

14. The valve of claim 3, wherein a changeover valve is connected in the fluid-conducting connection between the main piston and the pilot chamber, which valve forwards the respectively higher pressure of two fluid ports in the valve housing, via which the main volumetric flow is guided, into the pilot chamber as the signal pressure.

15. The valve of claim 2, wherein, as part of a fluid connection, a fluid chamber is created in the main piston, which chamber opens out via at least one connecting channel in the main piston into a further fluid chamber between the valve housing and the main piston, which chamber opens out via at least one further connecting channel in the valve housing with at least a partial overlap into the first recess in the pilot piston.

* * * * *